(12) United States Patent
Kim et al.

(10) Patent No.: US 12,236,098 B2
(45) Date of Patent: Feb. 25, 2025

(54) MEMORY DEVICE AND SCHEDULING METHOD THEREOF

(71) Applicant: Samsung Electronics Co., Ltd., Suwon-si (KR)

(72) Inventors: Nayeon Kim, Suwon-si (KR); Kyungsoo Kim, Suwon-si (KR); Yongsuk Kwon, Suwon-si (KR); Jinin So, Suwon-si (KR); Kyoungwan Woo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 8 days.

(21) Appl. No.: 18/322,798

(22) Filed: May 24, 2023

(65) Prior Publication Data

US 2024/0201858 A1 Jun. 20, 2024

(30) Foreign Application Priority Data

Dec. 20, 2022 (KR) .......................... 10-2022-0179463

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0613; G06F 3/0659; G06F 3/0673
See application file for complete search history.

(56) References Cited

U.S. PATENT DOCUMENTS

| 11,416,431 | B2 | 8/2022 | Malladi et al. |
| 2021/0263866 | A1 | 8/2021 | Norman et al. |
| 2021/0349840 | A1* | 11/2021 | Kumar ................ G06F 13/4068 |
| 2021/0374080 | A1 | 12/2021 | Horwich et al. |
| 2022/0100669 | A1 | 3/2022 | Choe et al. |
| 2022/0137865 | A1 | 5/2022 | Lee et al. |
| 2022/0188033 | A1 | 6/2022 | Cho et al. |
| 2023/0065395 | A1* | 3/2023 | Walker ................ G06F 3/0604 |

FOREIGN PATENT DOCUMENTS

KR 20220056986 A 5/2022

* cited by examiner

*Primary Examiner* — Eric Cardwell
(74) *Attorney, Agent, or Firm* — Myers Bigel, P.A.

(57) ABSTRACT

A memory includes: a request register configured to receive a first signal including a requester identifier using a first protocol from a host and configured to output a first priority corresponding to the requester identifier; a checker module configured to receive a second signal including a command and a request type from the host and using a second protocol that is different than the first protocol, where the checker module is configured to receive the first priority from the request register, and where the checker module is configured to determine a second priority of the command based on the first priority and the request type; a command generator configured to generate an internal command for memory operation based on the command; and a memory controller configured to schedule the internal command in a command queue based on the second priority.

20 Claims, 8 Drawing Sheets

MEMORY DEVICE AND SCHEDULING METHOD THEREOF

CROSS-REFERENCE TO RELATED APPLICATION

This application claims priority to and the benefit of Korean Patent Application No. 10-2022-0179463 filed in the Korean Intellectual Property Office on Dec. 20, 2022, the entire contents of which are incorporated herein by reference.

FIELD

The disclosure relates to a memory device and a scheduling method thereof.

BACKGROUND

Due to the rapid increase in data and the use of specialized workloads, such as compression, encryption, and artificial intelligence, there is an increasing demand for heterogeneous computing in which accelerators developed for special purposes operate together with general-purpose processors.

Such an accelerator may employ a high-performance connection with the processor, and ideally share a memory space to reduce overhead and latency. Accordingly, an inter-chip interconnection protocol is used to connect one or more processors to various accelerators and maintain memory and cache-coherence.

SUMMARY

One or more embodiments of the present disclosure provide a memory device that determines and processes the priority of commands using an inter-chip interconnection protocol, and a scheduling method thereof.

The present disclosure provides a memory comprising: a request register configured to receive a first signal including a requester identifier using a first protocol from a host and configured to output a first priority corresponding to the requester identifier; a checker module configured to receive a second signal including a command and a request type from the host and using a second protocol that is different than the first protocol, where the checker module is configured to receive the first priority from the request register, and where the checker module is configured to determine a second priority of the command based on the first priority and the request type; a command generator configured to generate an internal command for memory operation based on the command; and a memory controller configured to schedule the internal command in a command queue based on the second priority.

In one embodiment, the request register and the checker module are configured to receive the first signal and the second signal, respectively, at the same time.

In one embodiment, the first protocol may be a CXL.io protocol, and the second protocol may be a CXL.mem protocol.

In one embodiment, the second signal comprises a metadata field that indicates the request type, the second signal indicates that the command is an emergency request when a value of the metadata field is a first value, and the second signal indicates that the command is a normal request when the value of the metadata field is a second value that is different than the first value.

In one embodiment, the checker module is configured to determine the second priority of the command when the command is the emergency request.

In one embodiment, the request register is configured to receive a third signal including a requester identifier from the host using the first protocol and to output a first priority corresponding to the requester identifier of the third signal, the checker module is configured to receive a fourth signal including a command and request type using the second protocol, the checker module is configured to receive a first priority corresponding to the requester identifier of the third signal from the request register, and the checker module is configured to determine a second priority of the command of the second signal and a second priority of the command of the fourth signal based on the first priority corresponding to the requester identifier of the first signal, a request type of the second signal, the first priority corresponding to the requester identifier of the third signal, and a request type of the fourth signal.

In one embodiment, the request type of the second signal and the request type of the fourth signal are the same, the checker module is configured to determine a second priority of the command of the second signal and a second priority of the command of the fourth signal based on the first priority corresponding to the requester identifier of the first signal and the first priority corresponding to the requester identifier of the third signal.

In one embodiment, the checker module is configured to determine that the second priority of the command of the second signal is higher than the second priority of the command of the fourth signal when the request type of the second signal is an emergency request and the request type of the fourth signal is a normal request In one embodiment, the checker module is configured to receive a fifth signal including a command and a request type from the accelerator, and the checker module is configured to determine the second priority of the command of the second signal, the second priority of the command of the fourth signal, and a second priority of the command of the fifth signal based on the first priority corresponding to the requester identifier of the first signal, the request type of the second signal, the first priority corresponding to the requester identifier of the third signal, the request type of the fourth signal, and the request type of the fifth signal.

In one embodiment, when the request type of the second signal and the request type of the fourth signal are the same, the checker module is configured to determine the second priority of the command of the second signal and the second priority of the command of the fourth signal based on the first priority corresponding to the requester identifier of the first signal and the first priority corresponding to the requester identifier of the third signal.

In one embodiment, the checker module is configured to determine a second priority of a command of a signal whose request type is an emergency request.

In one embodiment, the checker module is configured to determine the second priority of the command of the second signal to be higher than the second priority of the command of the fifth signal when the request type of the second signal is the emergency request and the request type of the fifth signal is an emergency request.

In one embodiment, the checker module is configured to determine the second priority of the command of the second signal to be higher than the second priority of the command of the fifth signal when the first priority corresponding to the requester identifier of the first signal is high, the request type of the second signal is a normal request, and the request type of the fifth signal is the normal request.

In one embodiment, the checker module is configured to determine the second priority of the command of the second signal and the second priority of the command of the fifth signal to be the same when the first priority corresponding to the requester identifier of the first signal is low, the request type of the second signal is a normal request, and the request type of the fifth signal is a normal request.

The present disclosure provides a compute express link (CXL) device comprising: a controller configured to receive a plurality of first commands from a plurality of processes of a host through a CXL protocol, where the controller is configured to receive a second command from an accelerator, and where the controller is configured to generate a command queue by scheduling the plurality of first commands and the second command based on a respective requester priority and a request type; and a memory configured to operate based on the command queue.

In one embodiment, the controller is configured to receive a requester identifier from each of the plurality of processes using a CXL.io protocol, the controller is configured to obtain the requester priority corresponding to the requester identifier of each of the plurality of processes, and the controller is configured to receive the plurality of first commands, the second command, and the request type using a CXL.mem protocol.

In one embodiment, the controller is configured to schedule the plurality of first commands and the second command, where the request type is one of an emergency request and a normal request, and where the emergency request is associated with a higher priority than the normal request.

In one embodiment, when the request type of the plurality of first commands is an emergency request and the request type of the second command is an emergency request, the controller is configured to schedule the plurality of first commands and the second command to process the plurality of first commands with priority over the second command.

In one embodiment, the controller is configured to schedule the plurality of first commands and the second commands to process commands from among the plurality of first commands and the second command having a higher requester priority first among the commands having the same request type.

A scheduling method according to an embodiment includes: receiving a requester identifier from a host using a first protocol; determining a first priority corresponding to the requester identifier based on a predetermined requester priority; receiving a signal including a command and a request type from the host using a second protocol that is different from the first protocol; determining a second priority of the command based on the first priority and the request type; and generating an internal command for a memory operation from the command and scheduling the internal command based on the second priority.

The present disclosure provides a memory comprising: a request register configured to receive a first signal including a requester identifier using a CXL.io protocol from a host and configured to output a first priority corresponding to the requester identifier; a checker module configured to receive a second signal including a command and a request type from the host and using a CXL.mem protocol, where the checker module is configured to receive the first priority from the request register, and where the checker module is configured to determine a second priority of the command based on the first priority and the request type; a command generator configured to generate an internal command for a memory operation based on the command; and a memory controller configured to schedule the internal command based on the second priority. The request register is configured to receive a third signal including a requester identifier from the host using the first protocol, the request register is configured to output a first priority corresponding to a requester identifier of the third signal, the checker module is configured to receive a fourth signal including a command and request type using the second protocol, the checker module is configured to receive a first priority corresponding to the requester identifier of the third signal from the request register, and the checker module is configured to determine a second priority of the command of the second signal and a second priority of the command of the fourth signal based on the first priority corresponding to a requester identifier of the first signal, a request type of the second signal, the first priority corresponding to the requester identifier of the third signal, and a request type of the fourth signal

DETAILED DESCRIPTION OF THE EMBODIMENTS

Figure 1:
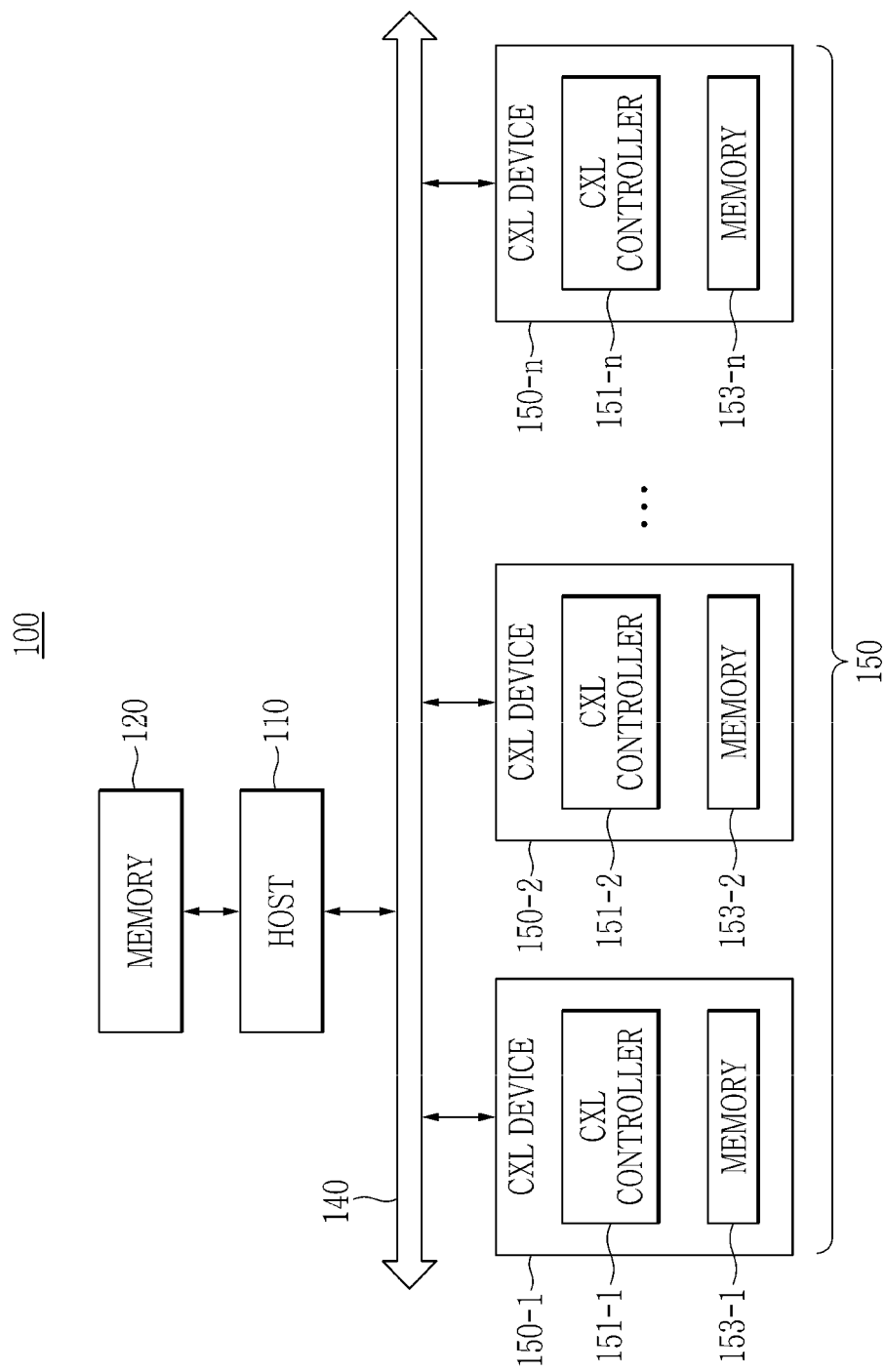
FIG. 1 is a block diagram of a computing system according to an embodiment of the present disclosure.

In the following detailed description, certain embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowchart described with reference to the drawings, the order of operations may be changed, several operations may be merged, a certain operation may be divided, and a specific operation may not be performed.

In addition, expressions written in the singular can be interpreted as singular or plural, unless explicit expressions such as "one" or "single" are used. Terms containing ordinal numbers, such as first and second, may be used to describe various configurations elements, but constituent elements are not limited by these terms. These terms may be used for the purpose of distinguishing one constituent element from another constituent element.

FIG. 1 is a block diagram of a computing system according to an embodiment of the present disclosure.

Referring to FIG. 1, a computer system 100 may include a host 110, a memory 120, and at least one compute express link (CXL) device 150. The computer system 100 may be used by a plurality of users, and each user may use at least one CXL device 150 through the host 110. At least one CXL device 150 may include first to $n^{th}$ CXL devices 150-1 to 150-$n$, where n is a natural number greater than or equal to 1. In some embodiments, the computer system 100 may be included in user computing devices, such as a personal computer (PC), a laptop computer, a server, a media player, a digital camera, and the like, or an automotive device, such as a navigation device, a black box, and electric vehicle equipment. Alternatively, the computer system 100 may be a mobile system, such as a portable communication terminal (e.g., a mobile phone), a smart phone, a tablet PC, a wearable device, a health care device, or an Internet of Things (IoT) device.

The host 110 may control the overall operation of the computer system 100. In an embodiment, the host 110 may be implemented by various processors, such as one of a central processing unit (CPU), a graphics processing unit (GPU), a neural processing unit (NPU), a data processing unit (DPU), and the like. In an embodiment, the host 110 may include a single core processor or a multicore processor.

In an embodiment, at least one CXL device 150 may operate as a cache buffer for the host 110. That is, the host 110 may use memories 153-1 to 153-$n$ of the at least one CXL device 150 as a cache buffer.

The host 110 may generate a signal for the at least one CXL device 150 and/or the memory 120. A signal may include a command and an address. In some embodiments, commands may include write commands or read commands. In some embodiments, the command may include an activate command and a read/write command. In some embodiments, the command may further include a pre-charge command, a refresh command, and the like.

The activate command may be a command that converts a target row of the memories 153-1 to 153-$n$ of the at least one CXL device 150 into an active state to write data to or read data from the at least one CXL device 150. Alternatively, the activate command may be a command that activates a target row of the memory 120 to write data to or read data from the memory 120. The at least one CXL device 150 and/or the memory 120 may activate (e.g., drive) a memory cell of a target row in response to an activate command. The read/write command may be a command for performing a read or write operation of a target memory cell of a row converted to an active state.

The host 110 may communicate with the at least one CXL device 150 using a different protocol. For example, the host 110 may communicate with the at least one CXL device 150 using at least one of a CXL.io protocol, a CXL.mem protocol, and a CXL.cache protocol.

The CXL.io protocol may be a protocol supported by the at least one CXL device 150. The host 110 may perform an initial configuration of the at least one CXL device 150, a memory capacity configuration, a virtualization, a device search and connection, and a register access using the CXL.io protocol.

The CXL.mem protocol may be a protocol that supports the host 110 to access the memories 153-1 to 153-$n$ of the at least one CXL device 150. The host 110 may recognize the memories 153-1 to 153-$n$ as additional memory spaces using the CXL.mem protocol. The CXL.mem protocol may support architectural memories 153-1 to 153-$n$, such as a volatile memory and a persistent memory.

The CXL.cache protocol may be a protocol supporting the at least one CXL device 150 to access the memory 120 of the host 110 to implement cache coherence. The CXL.cache protocol defines the interaction between the host 110 and the at least one CXL device 150, and the at least one CXL device 150 may effectively cache the memory 120 of the host 110.

In an embodiment, the host 110 may execute at least one process using a requester. By executing the process, the host 110 may simultaneously transmit a first signal and a second signal to one CXL device (e.g., the CXL device 150-1). That is, the CXL device 150-1 may simultaneously receive the first signal and the second signal. The first signal may include a requester identifier (ID). The second signal may include a command, an address, and a metadata field. The metadata field may include information indicating a request type. The request type may include an emergency request and a normal request. In some embodiments, the first signal and the second signal may further include additional data. The host 110 may transmit a first signal to the at least one CXL device 150 using the CXL.io protocol. The host 110 may transmit the second signal different than the first signal to the at least one CXL device 150 using the CXL.mem protocol.

The at least one CXL device 150 may generate a command queue in which a plurality of commands are scheduled. In some embodiments, the command queue may be a "first-in-first-out" (FIFO) command queue. The at least one CXL device 150 may operate based on the command queue. In some embodiments, the CXL device 150-1 that receives the first signal and the second signal schedules a plurality of commands (commands included in the second signal and scheduled in the command queue of the CXL device 150-1) based on the first signal and the second signal.

Since the CXL protocol operates with non-deterministic latency, a CXL device may sequentially process a plurality of commands output from a host in a conventional computer system. In the embodiments described herein, the computer system 100 schedules a plurality of commands based on the first signal and the second signal. Accordingly, while the CXL protocol may still operate with non-deterministic latency, the at least one CXL device 150 prioritizes an urgent process. An embodiment in which the at least one CXL device 150 schedules a plurality of commands using a first signal and a second signal is described below with reference to FIGS. 2-5.

The memory 120 may be a main memory or a system memory of the computer system 100. In an embodiment, the memory 120 may be a dynamic random access memory (DRAM) device and may have a form factor of a dual in-line memory module (DIMM). However, the present disclosure is not limited thereto, and the memory 120 may include a non-volatile memory, such as a flash memory, a phase-change memory (PRAM), a resistive random-access memory (RRAM), and a magnetoresistive random-access memory (MRAM).

In some embodiments, the host 110 may be directly connected to the memory 120. In some embodiments, the memory 120 may communicate directly with the host 110 through a double data rate (DDR) interface. In an embodiment, the host 110 may include a memory controller formed to control the memory 120. However, one or more embodiments of the present disclosure are not limited thereto, and the memory 120 may communicate with the host 110 through various interfaces.

The at least one CXL device 150 may include CXL controllers 151-1 to 151-*n* and the memories 153-1 to 153-*n*. In an embodiment, the memories 153-1 to 153-*n* may operate as cache buffers for each of the at least one CXL devices 150. That is, the at least one CXL device 150 may use each of memories 153-1 to 153-*n* as a cache buffer.

The CXL controllers 151-1 to 151-*n* may include an intellectual property (IP) circuit (or IP cores) designed to implement an application specific integrated circuit (ASIC) and/or a field-programmable gate array (FPGA). In various embodiments, the CXL controllers 151-1-151-*n* may be implemented to support the CXL protocol (e.g., the CXL 2.0 protocol, the CXL 3.0 protocol, or various other CXL protocols). The CXL controllers 151-1 to 151-*n* may exchange CXL packets and signals of a memory interface of the memory 120 with each other.

In an embodiment, each of the at least one CXL device 150 may be implemented as an individual memory device or memory module. Each of the at least one CXL device 150 may be connected to the CXL interface 140 through different physical ports. That is, the at least one CXL device 150 connected to the CXL interface 140 may be used as an individual memory device or memory module, and a memory region managed by the host 110 may be increased to have high-capacity.

The memories 153-1 to 153-*n* include at least one of a Dynamic Random Access Memory (DRAM), a Not-AND (NAND) flash memory, a High Bandwidth Memory (HBM), a Hybrid Memory Cube (HMC), a Dual In-line Memory Module (DIMM), an Optane DIMM, a Non-Volatile Memory DIMM (NVMDIMM), a Double Data Rate Synchronous DRAM (DDR SDRAM), and a Low-Power Double Data Rate Synchronous Dynamic Random Access Memory (LPDDR SDRAM) or a combination thereof.

In an embodiment, the host 110 and the at least one CXL device 150 may share the same interface. For example, the host 110 and the at least one CXL device 150 may communicate with each other through the CXL interface 140. In an embodiment, the CXL interface 140 may be a low-latency and high-bandwidth link that enables various connections between accelerators, memory devices, or various electronic devices by supporting coherency, memory access, and dynamic protocol multiplexing (MUX) of an input/output protocol (I/O protocol).

In FIG. 1, the host 110 and at least one CXL device 150 may communicate with each other through the CXL interface 140, but this is not restrictive. For example, the host 110 and the at least one CXL device 150 may communicate with each other based on various computing interfaces, such as a GEN-Z protocol, an NVLink protocol, a cache coherent interconnect for accelerators (CCIX) protocol, and an Open coherent accelerator processor interface (CAPI) protocol.

Figure 2:
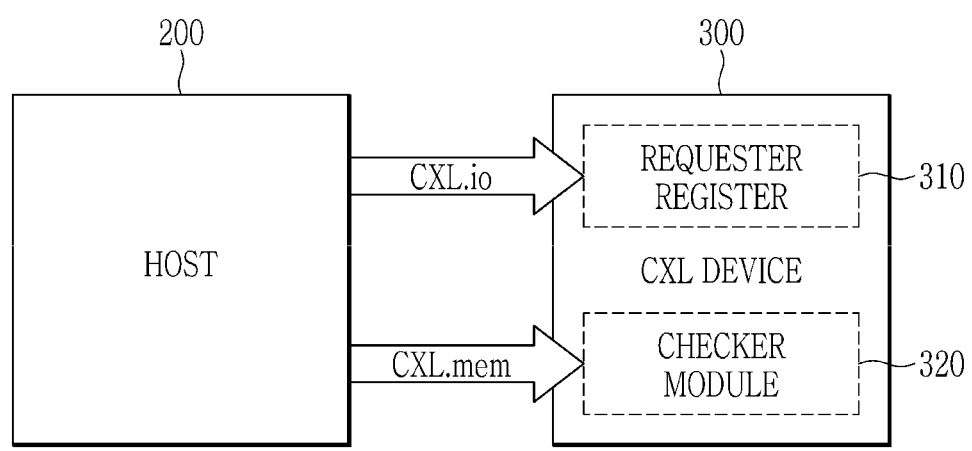
FIG. 2 is provided for description of operations of a host and a CXL device according to an embodiment of the present disclosure.
Figure 3:
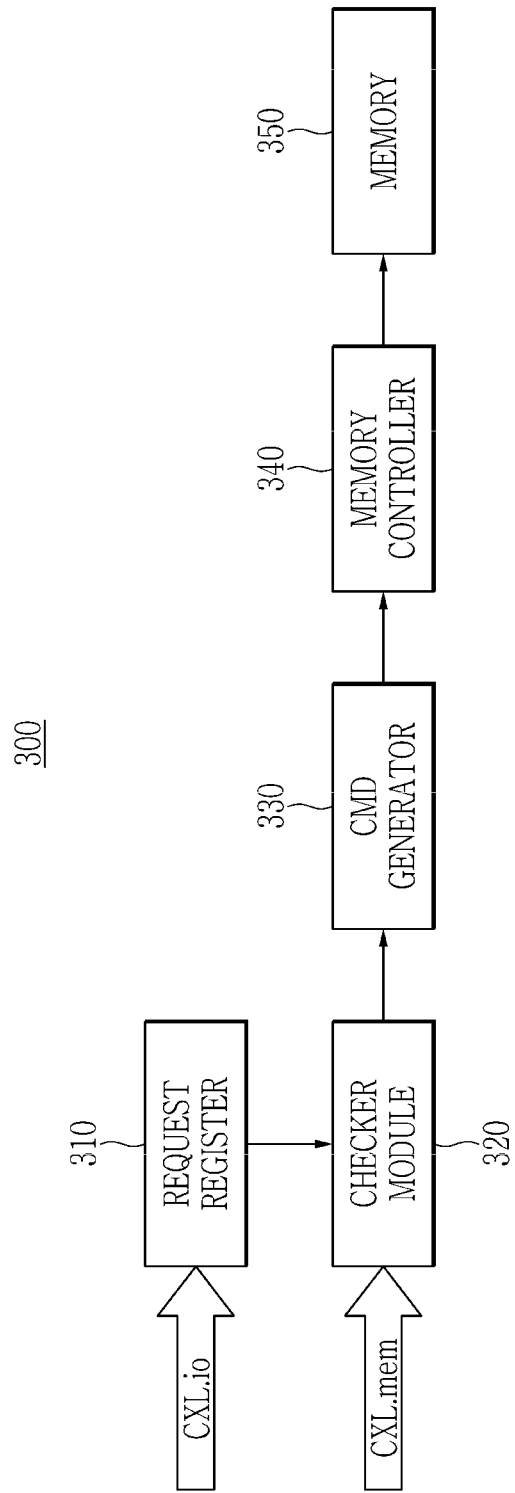
FIG. 3 is a schematic block diagram of a CXL device according to an embodiment of the present disclosure.

FIG. 2 is provided for description of operations of a host and a CXL device according to an embodiment, and FIG. 3 is a schematic block diagram of a CXL device according to an embodiment.

Referring to FIG. 2, a host 200 according to an embodiment is used by at least one requester and may execute a plurality of processes. The plurality of processes may each correspond to at least one requester. That is, at least one requester may issue a plurality of processes. Each process may generate a command and transmit the generated command to a CXL device 300. That is, the CXL device 300 may receive a plurality of commands based on a plurality of processes. The CXL device 300 may schedule and process the plurality of commands according to a processing policy. For example, the processing policy may include a requester's priority, a request type, and the like.

The host 200 may transmit a first signal and a second signal to the CXL device 300 using different protocols. For example, the host 200 may transmit a first signal to the CXL device 300 using the CXL.io protocol and transmit a second signal to the CXL device 300 using the CXL.mem protocol. The first signal may include a requester identifier. The second signal may include a command, an address, and a metadata field. In some embodiments, the first signal and the second signal may include additional data. For example, additional data may include data indicating size of the first signal and the second signal.

The CXL device 300 may include a request register 310 that receives the first signal and a checker module 320 that receives the second signal. The time at which the request register 310 receives the first signal and the time at which the checker module 320 receives the second signal may be the same. The request register 310 may transmit the priority of the requester to the checker module 320 based on the first signal. The checker module 320 may determine the priority of the plurality of commands based on the second signal and the determined requester. In other words, the CXL device 300 may schedule a plurality of commands output by a plurality of processes of the host 200 based on the first signal and the second signal. The CXL device 300 may control memory operations based on the scheduled commands.

Referring to FIG. 3, the CXL device 300 according to an embodiment may include the request register 310, the checker module 320, a command generator 330, a memory controller 340, and a memory 350.

The request register 310 may store requester IDs of a plurality of requesters (or a plurality of processes) using the host 200 and priorities corresponding to the requester IDs. The host 200 may record a plurality of requester IDs and priorities in the request register 310 using the CXL.io protocol. The plurality of requesters may have different priorities. For example, the plurality of requesters may use host 200 with different service-level agreements (SLAs). The host 200 may determine priorities of the plurality of requesters based on the SLA. The host 200 may determine a high priority for a requester with a relatively short SLA and a low priority for a requester with a relatively long SLA. In some embodiments, the host 200 may record, in the request register 310, the requester ID of the requester to be processed with priority.

Upon receiving the first signal from the host 200, the request register 310 may transmit the priority of the requester corresponding to the requester identifier included in the first signal to the checker module 320.

The checker module 320 may determine the priorities of the plurality of commands of the host 200 according to a processing policy. For example, the processing policy may include requester's priority, request type, and the like.

The checker module 320 may receive the priority of the requester from the request register 310. The checker module 320 may receive a second signal including a command, an address, and a metadata field from the host 200. The host 200 may generate and fill the metadata field with a first value for emergency requests. The host 200 may generate and fill the metadata field with a second value for normal requests. The first value and the second value may be different from each other. In an embodiment, the first value may be "1" and the second value may be "0". However, the first value and the second value are not limited thereto, and the first value may be "0" and the second value may be "1".

In an embodiment, the metadata field may be 2 bits. The host 200 may fill the metadata field with a third value for emergency requests. For example, the third value may be any one of "11", "10", "01", and "00". The host 200 may fill the metadata field with a fourth value that is different from the third value for a normal request. For example, the third value may be "10" and the fourth value may be "01", but an embodiment of the present disclosure may not be limited thereto.

The checker module 320 may determine the priorities of the plurality of commands based on the priority of the requester and the request type (or the value of the metadata field). For example, the checker module 320 may determine the priorities of the plurality of commands as shown in Table 1. In Table 1, the lower the priority number of the command, the higher priority may be indicated. That is, the lower the number, the higher the priority.

TABLE 1

| COMMAND PRIORITY | REQUESTER PRIORITY | REQUEST TYPE |
|---|---|---|
| 1 | HIGH | EMERGENCY |
| 2 | LOW | EMERGENCY |
| 3 | HIGH | NORMAL |
| 4 | LOW | NORMAL |

Referring to Table 1, the checker module 320 may determine the priority of a command with an emergency request type higher than that of a command with a normal request type. The checker module 320 may determine the priority of a command having a high requester priority higher than that of a command having a low requester priority.

The checker module 320 may determine the priority of the plurality of commands based on the request type and the priority of the requester. For example, the checker module 320 may first determine the priority of a command with an emergency request type higher than that of a command with a normal request type. Afterwards, the checker module 320 may determine a higher priority of a command having a higher requester priority than a command having a lower requester priority with respect to commands having the same request type.

That is, the checker module 320 may determine the priority of a command with an emergency request type and a high requester priority as "1", the priority of a command with an emergency request type and a low requester priority as "2", the priority of a command with a general request type and a high requester priority as "3", and the priority of a command with a normal request type and a low requester priority as "4".

In the present embodiment, it has been described that the checker module 320 primarily considers the request type and secondarily considers the priority of the requester, but is not necessarily limited thereto, and the checker module 320 may be implemented to primarily consider the priority of the requester and secondarily consider the request type in other embodiments.

In an embodiment, when the host 200 records only the ID of the requester to be processed with priority in the request register 310, the priority of the requester in Table 1 can be classified as YES or NO. In this case, yes/no may respectively correspond to the above-described high/low classifications.

The checker module 320 may transmit a plurality of commands, a plurality of addresses, and priorities of the plurality of commands to the command generator 330.

The command generator 330 may generate internal commands based on the plurality of commands, the plurality of addresses, and the priorities of the plurality of commands. The internal commands may include information indicating a command type, an address, and a priority. The command generator 330 may transmit the internal command to the memory controller 340. In some embodiments, the command generator 330 may be implemented such that it is disposed within the memory controller 340.

The memory controller 340 may create a command queue by scheduling a plurality of internal commands. The memory controller 340 may perform scheduling according to the priority of commands. For example, the memory controller 340 may include a heuristic scheduler that processes commands according to priorities. The memory controller 340 may generate a command queue using the heuristic scheduler. In an embodiment, the memory controller 340 may dispose a high-priority internal command to the right of the command queue. The memory controller 340 may dispose an internal command having a low priority to the left side of the command queue. In this case, the memory controller 340 may sequentially transmit internal commands to the memory 350 from the right side based on the command queue.

The memory 350 may operate based on the internal commands. Internal commands for urgent processes are disposed on the right side of the command queue and transmitted to the memory 350 first, and thus the memory 350 can process urgent processes first. That is, while a conventional CXL device does not process an urgent process in one embodiment, the CXL device 300 has an advantage of processing an urgent process with priority.

Figure 4:
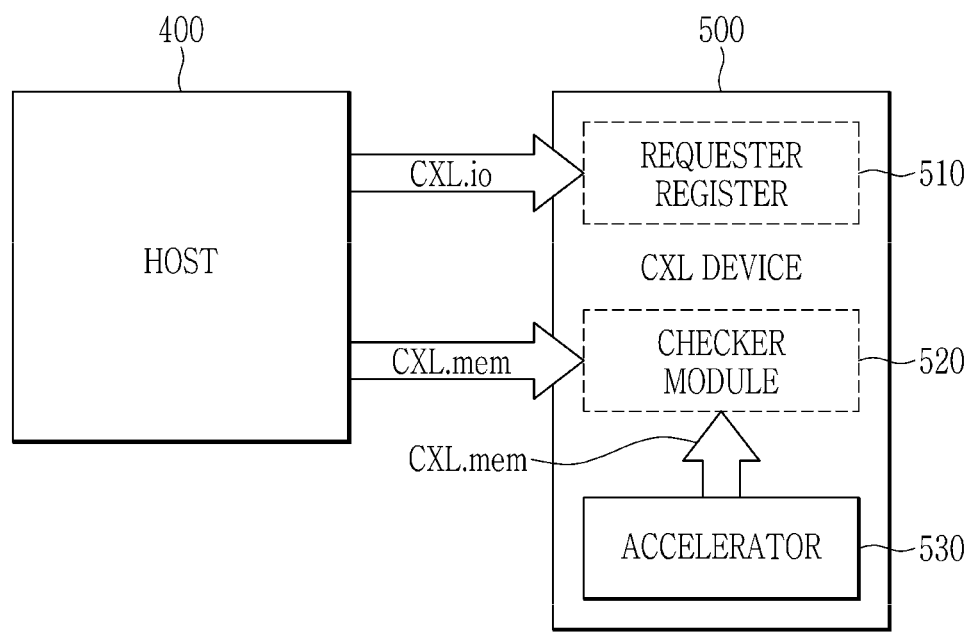
FIG. 4 is provided for description of operation of a host and a CXL device according to an embodiment of the present disclosure.
Figure 5:
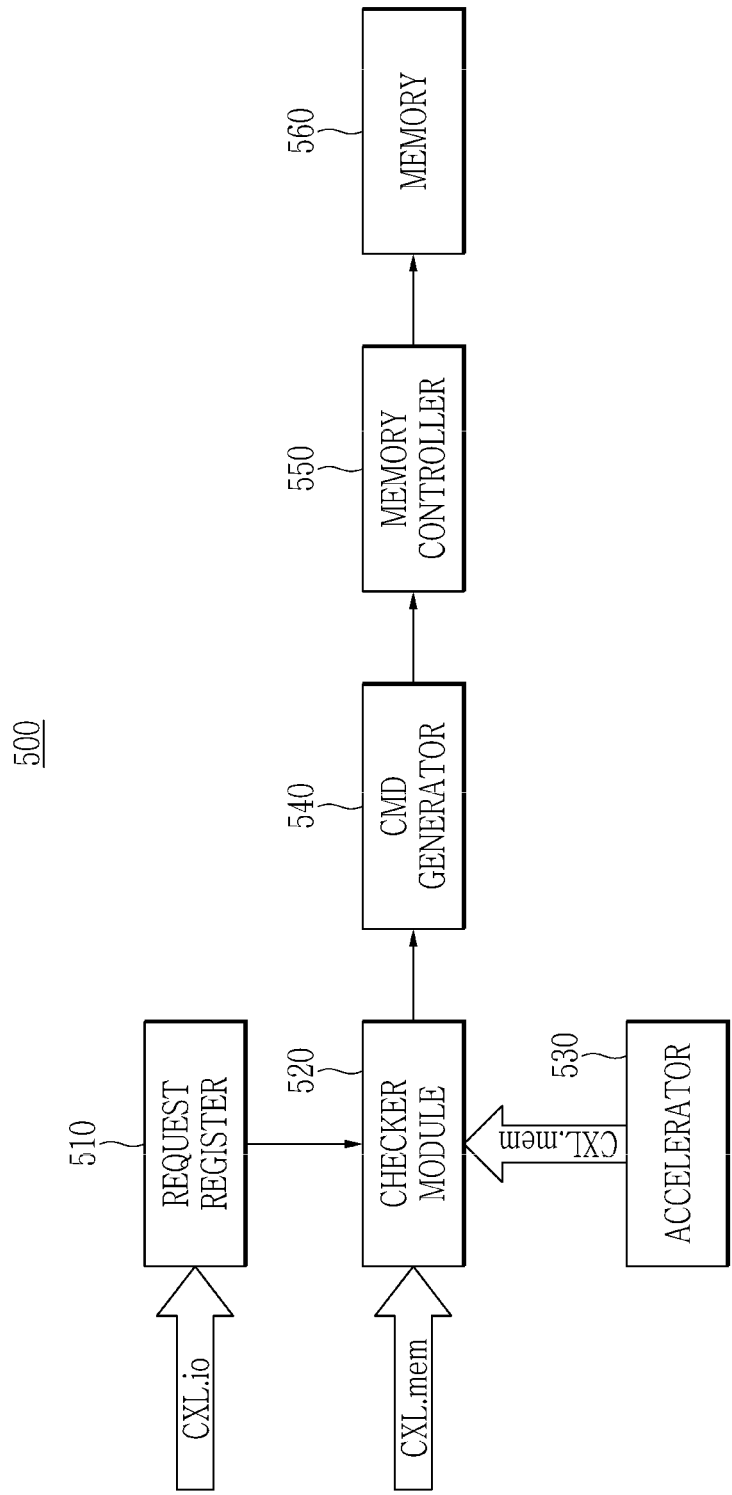
FIG. 5 is a schematic block diagram of the CXL device according to an embodiment of the present disclosure.

FIG. 4 illustrates an operation of a host and a CXL device according to an embodiment, and FIG. 5 is a schematic block diagram of the CXL device according to an embodiment.

Referring to FIG. 4, a host 400 according to an embodiment is used by at least one requester, and may execute a plurality of processes. A plurality of processes may each correspond to at least one requester. Each process may generate a first command and transmit the first command to a CXL device 500. That is, the CXL device 500 may receive a plurality of first commands from the plurality of processes. In addition, the CXL device 500 may process a plurality of second commands output by an accelerator 530 within the CXL device 500. The CXL device 500 may schedule and process a plurality of commands including a first command and a second command according to a processing policy. For example, the processing policy may include a requester's priority, a request type, and the like.

The host 400 may transmit a first signal and a second signal to the CXL device 500 using different protocols. For example, the host 400 may transmit the first signal to the CXL device 500 using a CXL.io protocol and transmit the second signal to the CXL device 500 using a CXL.mem protocol. The first signal may include a requester identifier. The second signal may include the first command, an address, and a metadata field.

The accelerator 530 may transmit a third signal to a checker module 520 of the CXL device 500 using the CXL.mem protocol. The third signal may include the second command, an address, and a metadata field. In an embodiment, the accelerator 530 may be disposed inside the CXL device 500. In some embodiments, the accelerator 530 may be implemented such that it is disposed externally from the CXL device 500. In addition, the first signal, the second signal, and the third signal may further include additional data.

The CXL device 500 may include a request register 510 for receiving the first signal and the checker module 520 for receiving the second signal and the third signal. The time at which the request register 510 receives the first signal and the time at which the checker module 520 receives the second signal may be the same. The request register 510 may transmit the priority of the requester to the checker module 520 based on the first signal. The checker module 520 may determine the priority of a plurality of first commands based on the priority of the second signal and the requester.

The CXL device 500 may schedule a plurality of first commands output by a plurality of processes of the host 400 and a plurality of second commands output by the accelerator 530 based on the first signal, the second signal, and the third signal. The CXL device 500 may control memory operations based on scheduled commands.

Referring to FIG. 5, the CXL device 500 according to an embodiment may include the request register 510, the checker module 520, an accelerator 530, a command generator 540, a memory controller 550, and a memory 560.

The request register 510 may store requester IDs of a plurality of requesters (or a plurality of processes) using the host 400 and priorities corresponding to the requester IDs. The host 400 may record a plurality of requester IDs and priorities in the request register 510 using the CXL.io protocol. A plurality of requesters may have different priorities. For example, the plurality of requesters may use the host 400 with different SLAs. The host 400 may determine priorities of the plurality of requesters based on the SLA. The host 400 may determine a high priority for a requester with a relatively short SLA and a low priority for a requester with a relatively long SLA. In some embodiments, the host 400 may record, in the request register 510, only the requester ID of the requester to be processed with priority.

Upon receiving the first signal from the host 400, the request register 510 may transmit the priority of the requester corresponding to the requester identifier included in the first signal to the checker module 520.

The checker module 520 may receive the priority of the requester from the request register 510. The checker module 520 may receive a second signal including a first command, an address, and a metadata field from the host 400. The checker module 520 may receive a third signal including a second command, an address, and a metadata field from the accelerator 530. The metadata field may include information indicating a request type. The request type may include an emergency request and a normal request. For example, the host 400 and the accelerator 530 may indicate an emergency to the checker module 520 by filling different values in the metadata field. For example, in a 2-bit metadata field, "10" may indicate an emergency request, and "01" may indicate a normal request. However, it should be understood that the 2-bit metadata field of the present disclosure is not limited thereto and other representations may be employed.

The checker module 520 may determine priorities of the plurality of commands output by the host 400 and the accelerator 530 according to a processing policy. For example, the processing policy may include a requester's priority, a request type, and the like.

The checker module 520 may determine the priorities of the plurality of commands based on the priority of the requester and the request type (or a value of the metadata field). For example, the checker module 520 may determine the priorities of the plurality of commands as shown in Table 2. In Table 2, the lower the priority number of the command, the higher priority processing may be indicated. That is, the lower the number, the higher the priority.

TABLE 2

| COMMAND PRIORITY | REQUESTER PRIORITY | REQUEST TYPE | FROM |
| --- | --- | --- | --- |
| 1 | HIGH | EMERGENCY | HOST |
| 2 | LOW | EMERGENCY | HOST |
| 3 | — | EMERGENCY | ACCELERATOR |
| 4 | HIGH | NORMAL | HOST |
| 5 | LOW | NORMAL | HOST |
| 5 | — | NORMAL | ACCELERATOR |

Referring to Table 2, the checker module 520 may determine the priority of a command with an emergency request type higher than that of a command with a normal request type. The checker module 520 may determine the priority of a command having a high requester priority higher than that of a command having a low requester priority.

When determining the priority of a plurality of commands, the checker module 520 may primarily consider the request type, secondarily consider the priority of the requester, and thirdly consider a command source. That is, the checker module 320 may first determine the priority of a command with an emergency request type higher than that of a command with a normal request type. Subsequently, the checker module 320 may determine a higher priority of a command having a higher requester priority than a command having a lower requester priority with respect to commands having the same request type. The checker module 520 may determine a higher priority of a command of the host 400 than a command of the accelerator 530 among commands having an emergency request type. In addition, the checker module 520 may determine the priority of the command of the accelerator 530 and the priority of the command of the host 400 having a low requester priority among commands of a general request type are equal.

That is, the checker module 520 may determine the priority of a command from the host 400 with an emergency request type and a high requester priority as "1", the priority of a command from the host 400 with an emergency request type and a low requester priority as "2", the priority of a command from the accelerator 530 with an emergency request type and a high requester priority as "3", the priority of a command from the host 400 with a normal request type and a high requester priority as "4", and the priority of the command of the accelerator 530, which is the priority of a command from the host 400 with a normal request type and a low requester priority, as "5". Since the command from the host 300 with a normal request type and a low requester priority and the command from the accelerator 530 with a normal request type have the same priority, the CXL device 500 may process commands with the same command priority in chronological order.

In the present embodiment, it has been described that the checker module 520 primarily considers the request type and secondarily considers the priority of the requester, but is not necessarily limited thereto, and the checker module 520 may be implemented to primarily consider the priority of the requester and secondarily consider the request type in other embodiments.

In an embodiment, when the host 400 records only the ID of the requester to be processed with priority in the request register 510, the priority of the requester in Table 2 can be classified as YES or NO. In this case, yes/no may respectively correspond to the above-described high/low classifications.

The checker module 520 may transmit the plurality of commands, a plurality of addresses, and priorities of the plurality of commands to the command generator 540.

The command generator 540 may generate internal commands based on the plurality of commands, the plurality of addresses, and the priorities of the plurality of commands. The internal commands may include information indicating a command type, address, and priority. The command generator 540 may transmit the internal commands to the memory controller 550. In some embodiments, the command generator 540 may be implemented such that it is disposed within the memory controller 550.

The memory controller 550 may create a command queue by scheduling a plurality of internal commands. The memory controller 550 may perform scheduling according to the priority of the command. For example, the memory controller 550 may include a heuristic scheduler that processes commands according to priorities. The memory controller 550 may generate a command queue using the heuristic scheduler. In an embodiment, the memory controller 550 may dispose high priority internal commands to the right of the command queue. The memory controller 550 may dispose an internal command having a low priority to the left side of the command queue. In this case, the memory controller 550 may sequentially transmit internal commands to the memory 560 from the right side based on the command queue.

The memory 560 may operate based on the internal commands. Internal commands for urgent processes are disposed on the right side of the command queue and transmitted to the memory 560 first, and thus the memory 560 can process urgent processes first. That is, while a conventional CXL device does not process an urgent process in one embodiment, the CXL device 500 has an advantage of processing an urgent process with priority.

Figure 6:
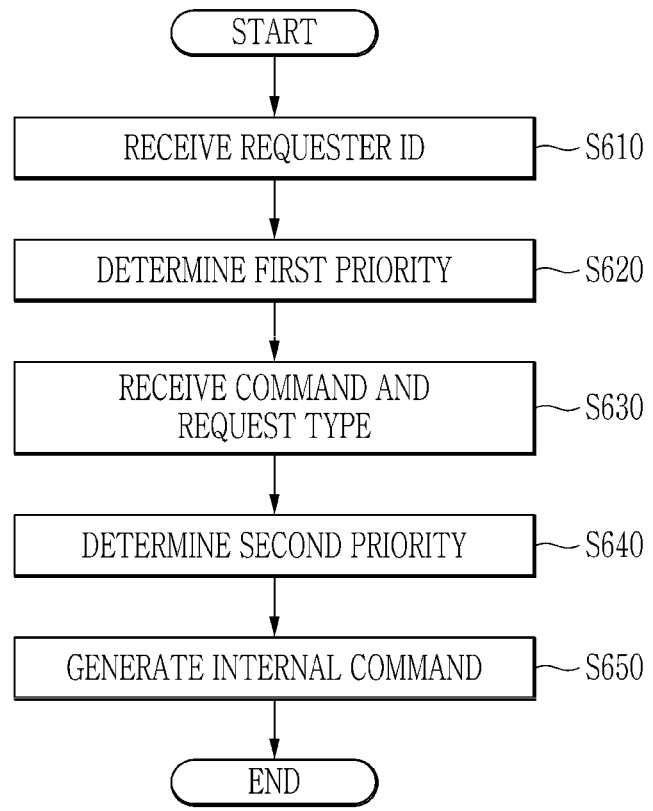
FIG. 6 is a flowchart of a scheduling method according to an embodiment of the present disclosure.

FIG. 6 is a flowchart of a scheduling method according to an embodiment.

Referring to FIG. 6, a scheduling method according to an embodiment may be performed by a CXL device. The CXL device may schedule a command using the scheduling method according to an embodiment and operate a memory according to the scheduling method. For example, the CXL device may receive a command from at least one of a host and an accelerator, and schedule the command according to a priority.

The CXL device may receive a requester identifier (ID) from the host using a first protocol (S610). The first protocol may be a CXL.io protocol. The host is used by at least one requester, and the at least one requester may execute at least one process using the host. At least one process may transmit a signal including information such as a command, an address, and a requester identifier to the CXL device.

The CXL device may determine a first priority corresponding to the requester identifier based on the predetermined priority of the requester (S620). The CXL device may include a request register that stores predetermined requester priorities. In an embodiment, the request register may store priorities among a plurality of requesters as a number. In an embodiment, the request register may classify and store priorities of a plurality of requesters as high or low. In an embodiment, a request register may classify and store a requester to be processed with priority among a plurality of requesters as having priority or not having priority. The request register may output the first priority corresponding to the requester identifier in the predetermined priority of the requester.

The CXL device may receive a signal including a command and request type from the host using a second protocol that is different from the first protocol (S630). The second protocol may be a CXL.mem protocol. The command may include an activate command, a read/write command, a precharge command, a refresh command, and the like. The request type may include an emergency request and a normal request. A signal received using the second protocol includes a metadata field, and emergency requests and normal requests may be distinguished by different values in the metadata field. The signal received using the second protocol may further include an address corresponding to a command.

The CXL device may determine a second priority of the command based on the first priority and the request type (S640). The CXL device may determine the second priority primarily based on the request type. The CXL device may determine a second priority of a command whose request type is an emergency request higher than a second priority of a command whose request type is a normal request. When the request type is the same, the CXL device may determine the second priority based on the first priority. For example, the CXL device may determine the second priority of each of the first command and the second command. The request type of the first command may be an emergency request and the first priority may be high, and the request type of the second command may be an emergency request and the second priority may be low. The CXL device may determine the second priority of the first command higher than the second priority of the second command. Even when the request type of the first command and the second command are normal requests, the above description may be similarly applied.

The CXL device may generate an internal command from the command (S650). A CXL device may create a command queue where internal commands are disposed. A command queue may refer to a queue of internal commands. In an embodiment, the CXL device may dispose an internal command with a second higher priority on the right side, and an internal command with a lower second priority on the left side. The CXL device may dispose internal commands with the same second priority in the order of received time from the right. The CXL device may schedule internal commands based on the second priority and transmit them to a memory.

Figure 7:
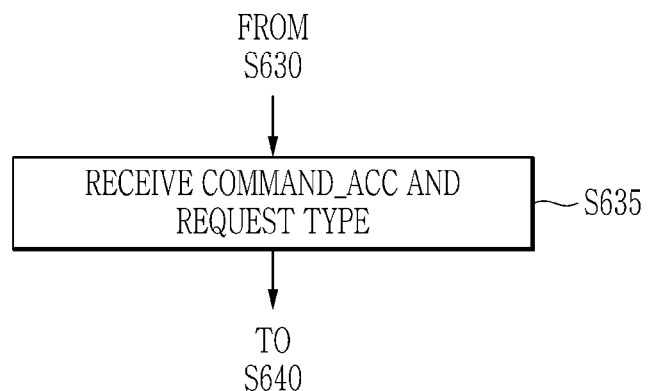
FIG. 7 is a flowchart of a scheduling method according to an embodiment of the present disclosure.

FIG. 7 is a flowchart of a scheduling method according to an embodiment.

Referring to FIG. 7, a CXL device according to an embodiment may receive a signal including a command and request type from an accelerator (S635). To distinguish a command received from the accelerator by the CXL device from a command received from the host, the command from the accelerator may be expressed as an accelerator command COMMAND_ACC.

In an embodiment, the CXL device may receive a first command and a second command from the host and receive a third command from the accelerator. The CXL device may determine second priorities of the first to third commands. For example, the CXL device may determine the second priority of commands, and the second priority of third commands based on the second priority of the first command, the request type of the first command, the first priority of the first command, the request type of the second command, the first priority of the second command, and the request type of the third command.

When the request type of the first command and the request type of the second command are the same, the CXL device may determine the second priority of the first command and the second priority of the second command based on the first priority of the first command and the first priority of the second command.

The CXL device may determine the second priority of a command whose request type is an emergency request higher than the second priority of a command whose request type is a normal request.

When the request type of the first command and the request type of the third command are emergency requests, the CXL device may determine the second priority of the first command to be higher than the second priority of the third command.

When the request type of the first command and the request type of the third command are normal requests and the first priority of the first command is high, the CXL device may determine the second priority of the first command to be higher than the second priority of the third command.

The CXL device may determine the second priority of the first command and the second priority of the third command are equal when the request type of the first command and the request type of the third command are normal requests and the first priority of the first command is low. The CXL device may sequentially process the received first command and third command with the same second priority.

Figure 8:
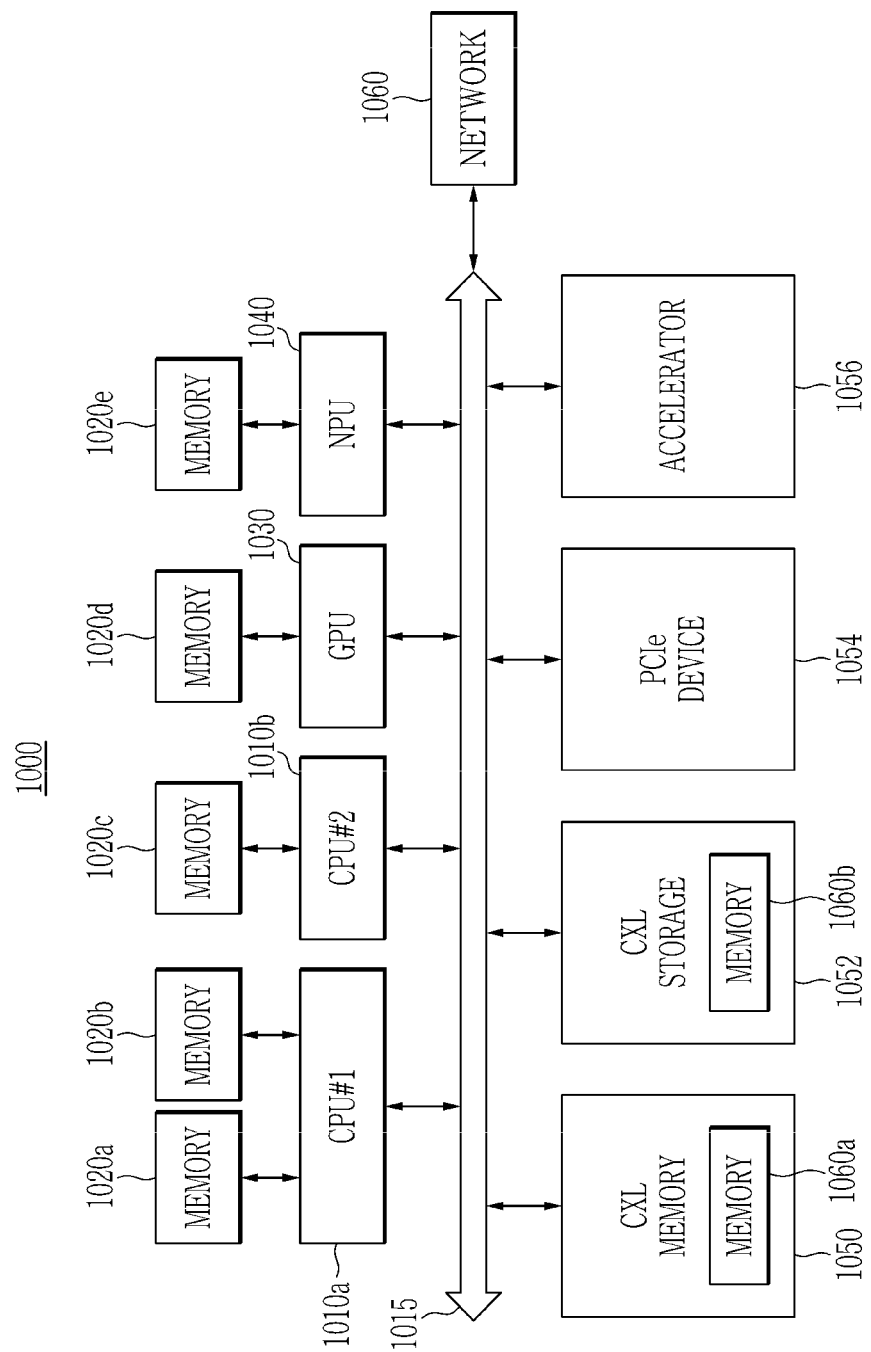
FIG. 8 is a block diagram of a computer system according to another embodiment of the present disclosure.

FIG. 8 is a block diagram of a computer system according to another embodiment.

Referring to FIG. 8, a computer system 1000 may include a first CPU 1010a, a second CPU 1010b, a GPU 1030, an NPU 1040, a CXL switch 1015, a CXL memory 1050, a CXL storage 1052, a PCIe device 1054, and an accelerator (CXL device) 1056.

The first CPU 1010a, the second CPU 1010b, the GPU 1030, the NPU 1040, the CXL memory 1050, the CXL storage 1052, the PCIe device 1054, and the accelerator 1056 may be commonly connected to a CXL switch 1015, and each of these components may communicate with each other through the CXL switch 1015.

In an embodiment, the first CPU 1010a, the second CPU 1010b, the GPU 1030, and the NPU 1040 may be implemented by the host described with reference to FIG. 1 to FIG. 7 (e.g., the host 110, the host 200, or the host 400), and each of these components may be directly connected to individual memories 1020a, 1020b, 1020c, 1020d, and 1020e.

In an embodiment, the CXL memory 1050 and the CXL storage 1052 may be implemented by the CXL device described with reference to FIG. 1 to FIG. 7 (e.g., the CXL device 150-1 to 150-n, the CXL device 300, or the CXL device 500), and at least some regions of memories 1060a and 1060b of the CXL memory 1050 and the CXL storage 1052, respectively, may be allocated to a cache buffer of at least one of the first CPU 1010a, the second CPU 1010b, the GPU 1030, the NPU 1040, the CXL memory 1050, the CXL storage 1052, the PCIe device 1054, and the accelerator 1056 by any one or more of the first CPU 1010a, the second CPU 1010b, the GPU 1030, and the NPU 1040.

In an embodiment, the CXL switch 1015 may be connected to the PCIe device 1054 or the accelerator 1056 formed to support various functions, and the PCIe device 1054 or the accelerator 1056 may communicate with the first CPU 1010a, the second CPU 1010b, the GPU 1030, and the NPU 1040 or access the CXL memory 1050 and the CXL storage 1052 through the CXL switch 1015.

In an embodiment, the CXL switch 1015 may be connected to an external network 1060 or fabric and may be configured to communicate with an external server through the external network 1060 or fabric.

Figure 9:
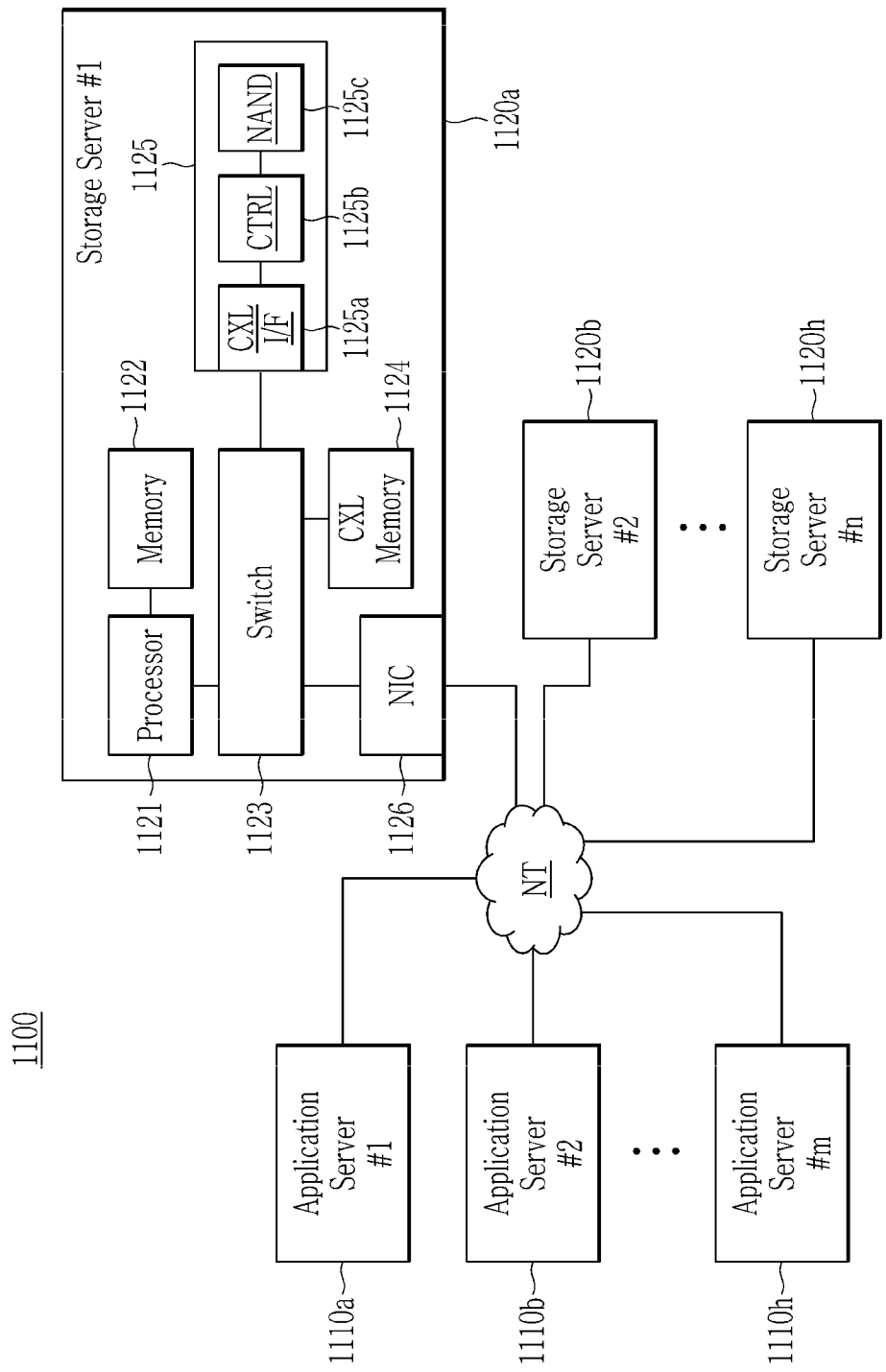
FIG. 9 is a block diagram of a server system according to an embodiment of the present disclosure.

FIG. 9 is a block diagram of a server system according to an embodiment.

Referring to FIG. 9, a data center 1100 is a facility that collects various data and provides services, and may be referred to as a data storage center. The data center 1100 may be a system for operating a search engine and a database, and may be a computer system used by companies, such as banks or government agencies. The data center 1100 may include application servers 1110a to 1110h and storage servers 1120a to 1120h. The number of application servers and the number of storage servers may be selected according to various embodiments, and the number of application servers and the number of storage servers may be different than each other.

Hereinafter, the configuration of the first storage server 1120a will be mainly described. Each of the application servers 1110a to 1110h and the storage servers may have a similar structure, and the application servers 1110a to 1110h may communicate with each other through a network NT.

The first storage server 1120a may include a processor 1121, a memory 1122, a switch 1123, a storage device 1125, a CXL memory 1124, and a network interface card (NIC) 1126. The processor 1121 may control the overall operation of the first storage server 1120a, access the memory 1122, execute instruction commands loaded in the memory 1122, and/or process data. The processor 1121 and the memory 1122 may be directly connected, and the number of processors 1121 and memories 1122 included in one storage server 1120a may vary.

In an embodiment, the processor 1121 and the memory 1122 may provide a processor-memory pair. In an embodiment, the number of processors 1121 and the number of memories 1122 may be different. The processor 1121 may include a single core processor or a multi-core processor. The above description of the storage server 1120 may be similarly applied to each of the application servers 1110a to 1110h.

The switch 1123 may be configured to mediate or route communication between various configurations elements included in the first storage server 1120a. In an embodiment, the switch 1123 may be the CXL switch described with reference to FIG. 8 (e.g., the CXL switch 1015). That is, the switch 1123 may be a switch implemented based on the CXL protocol.

The CXL memory 1124 and the storage device 1125 may be the CXL device described with reference to FIG. 1 to FIG. 8 (e.g., the CXL memory 1050 and the CXL storage 1052, respectively).

The CXL memory 1124 may be connected to the switch 1123. The storage device 1125 may include a CXL interface circuit (CXL_IF 1125a), a controller (CTRL 1125b), and a NAND flash (NAND 1125c). The storage device 1125 may store data or output stored data according to a request of the processor 1121.

The application servers 1110a to 1110h may not include the storage device 1125.

The NIC 1126 may be connected to the switch 1123. The NIC 1126 may communicate with other storage servers 1120a to 1120h or other application servers 1110a to 1110h through the network NT.

In an embodiment, the NIC 1126 may include a network interface card, a network adapter, and the like. The NIC 1126 may be connected to the network NT through a wired interface, wireless interface, Bluetooth interface, optical interface, or the like. The NIC 1126 may include an internal memory, a digital signal processor (DSP), a host bus interface, and the like, and may be connected to the processor 1121 and/or the switch 1123 through the host bus interface. In an embodiment, the NIC 1126 may be integrated with at least one of the processor 1121, the switch 1123, and the storage device 1125.

In an embodiment, the network NT may be implemented using Fiber Channel (FC) or Ethernet. In this case, the FC is a medium used for relatively high-speed data transmission, and an optical switch providing high performance/high availability can be used. Depending on an access method of the network (NT), storage servers may be provided as a file storage, a block storage, or an object storage.

In an embodiment, the network NT may be a storage-only network, such as a storage area network (SAN). For example, the SAN may be an FC-SAN using an FC network and implemented according to the FC Protocol (FCP). As another example, the SAN may be an IP-SAN using a TCP/IP network and implemented according to an SCSI over TCP/IP or Internet SCSI (iSCSI) protocol. In an embodiment, the network NT may be a general network, such as a TCP/IP network. For example, the network NT may be implemented according to protocols such as FC over Ethernet (FCoE), Network Attached Storage (NAS), and NVMe over Fabrics (NVMe-oF).

In an embodiment, at least one of the application servers 1110a to 1110h may store data requested by a user or client in one of the storage servers 1120a to 1120h through the network NT. At least one of the application servers 1110a to 1110h may acquire data requested by a user or client to read from one of the storage servers 1120a to 1120h through the network NT. For example, at least one of the application servers 1110a to 1110h may be implemented as a web server or a database management system (DBMS).

In an embodiment, at least one of the application servers 1110a to 1110h may access a memory, a CXL memory, or a storage device contained in another application server through the network NT, or may access memories included in the storage servers 1120a to 1120h, CXL memories, or storage devices through the network NT. Thus, at least one of the application servers 1110a to 1110h may perform various operations on data stored in other application servers and/or storage servers. For example, at least one of the application servers 1110a to 1110h may execute instruction commands for moving or copying data between other application servers and/or storage servers. In this case, data may be moved from the storage devices of storage servers through memories of storage servers or CXL memories, or directly to memories of application servers or CXL memories. Data moving through the network may be encrypted data for security or privacy.

In some embodiments, the combination of constituent elements of each constituent element or two or more described with reference to FIG. 1 to FIG. 9 may be implemented as a digital circuit, a programmable or unprogrammable logic device or array, an application specific integrated circuit (ASIC), and the like.

While this disclosure has been described in connection with what is presently considered to be practical embodiments, it is to be understood that the disclosure is not limited to the disclosed embodiments. That is, the present disclosure is intended to cover various modifications and equivalent arrangements included within the spirit and scope of the appended claims.

What is claimed is:

1. A memory device comprising:
    a request register configured to receive a first signal including a requester identifier using a first protocol from a host and configured to output a first priority corresponding to the requester identifier;
    a checker module configured to receive a second signal including a command and a request type from the host and using a second protocol that is different than the first protocol, wherein the checker module is configured to receive the first priority from the request register, and wherein the checker module is configured to determine a second priority of the command based on the first priority and the request type;
    a command generator configured to generate an internal command for memory operation based on the command; and
    a memory controller configured to schedule the internal command in a command queue based on the second priority.

2. The memory device of claim 1, wherein the request register and the checker module are configured to receive the first signal and the second signal, respectively, at the same time.

3. The memory device of claim 1, wherein:
    the first protocol is a CXL.io protocol, and
    the second protocol is a CXL.mem protocol.

4. The memory device of claim 1, wherein:
    the second signal comprises a metadata field that indicates the request type,
    the second signal indicates that the command is an emergency request when a value of the metadata field is a first value, and
    the second signal indicates that the command is a normal request when the value of the metadata field is a second value that is different than the first value.

5. The memory device of claim 4, wherein the checker module is configured to determine the second priority of the command when the command is the emergency request.

6. The memory device of claim 1, wherein:
    the request register is configured to receive a third signal including a requester identifier from the host using the first protocol, and the request register is configured to output a first priority corresponding to a requester identifier of the third signal,
    the checker module is configured to receive a fourth signal including a command and request type using the second protocol,
    the checker module is configured to receive a first priority corresponding to the requester identifier of the third signal from the request register, and
    the checker module is configured to determine a second priority of the command of the second signal and a second priority of the command of the fourth signal based on the first priority corresponding to the requester identifier of the first signal, a request type of the second signal, the first priority corresponding to the requester identifier of the third signal, and a request type of the fourth signal.

7. The memory device of claim 6, wherein when the request type of the second signal and the request type of the fourth signal are the same, the checker module is configured to determine a second priority of the command of the second signal and a second priority of the command of the fourth signal based on the first priority corresponding to the requester identifier of the first signal and the first priority corresponding to the requester identifier of the third signal.

8. The memory device of claim 6, wherein the checker module is configured to determine that the second priority of the command of the second signal is higher than the second priority of the command of the fourth signal when the request type of the second signal is an emergency request and the request type of the fourth signal is a normal request.

9. The memory device of claim 6, wherein:
the checker module is configured to receive a fifth signal including a command and a request type from an accelerator, and
the checker module is configured to determine the second priority of the command of the second signal, the second priority of the command of the fourth signal, and a second priority of the command of the fifth signal based on the first priority corresponding to the requester identifier of the first signal, the request type of the second signal, the first priority corresponding to the requester identifier of the third signal, the request type of the fourth signal, and the request type of the fifth signal.

10. The memory device of claim 9, wherein when the request type of the second signal and the request type of the fourth signal are the same, the checker module is configured to determine the second priority of the command of the second signal and the second priority of the command of the fourth signal based on the first priority corresponding to the requester identifier of the first signal and the first priority corresponding to the requester identifier of the third signal.

11. The memory device of claim 9, wherein the checker module is configured to determine a second priority of a command of a signal whose request type is an emergency request.

12. The memory device of claim 11, wherein the checker module is configured to determine the second priority of the command of the second signal to be higher than the second priority of the command of the fifth signal when the request type of the second signal is the emergency request and the request type of the fifth signal is the emergency request.

13. The memory device of claim 11, wherein the checker module is configured to determine the second priority of the command of the second signal to be higher than the second priority of the command of the fifth signal when the first priority corresponding to the requester identifier of the first signal is high, the request type of the second signal is a normal request, and the request type of the fifth signal is the normal request.

14. The memory device of claim 11, wherein the checker module is configured to determine the second priority of the command of the second signal and the second priority of the command of the fifth signal to be the same when the first priority corresponding to the requester identifier of the first signal is low, the request type of the second signal is a normal request, and the request type of the fifth signal is the normal request.

15. A compute express link (CXL) device comprising:
a controller configured to receive a plurality of first commands from a plurality of processes of a host through a CXL protocol, wherein the controller is configured to receive a second command from an accelerator, and wherein the controller is configured to generate a command queue by scheduling the plurality of first commands and the second command based on a respective requester priority and a request type; and
a memory configured to operate based on the command queue,
wherein the controller is configured to schedule the plurality of first commands and the second command to process commands from among the plurality of first commands and the second command having a higher requester priority first among the commands having the same request type.

16. The CXL device of claim 15, wherein the controller is configured to receive a requester identifier from each of the plurality of processes using a CXL.io protocol, wherein the controller is configured to obtain the requester priority corresponding to the requester identifier of each of the plurality of processes, and wherein the controller is configured to receive the plurality of first commands, the second command, and the request type using a CXL.mem protocol.

17. The CXL device of claim 15, wherein the request type is one of an emergency request and a normal request, and wherein the emergency request is associated with a higher priority than the normal request.

18. The CXL device of claim 15, wherein when the request type of the plurality of first commands is an emergency request and the request type of the second command is an emergency request, the controller is configured to schedule the plurality of first commands and the second command to process the plurality of first commands with priority over the second command.

19. A method comprising:
receiving a requester identifier from a host using a first protocol;
determining a first priority corresponding to the requester identifier based on a predetermined requester priority;
receiving a signal including a command and a request type from the host using a second protocol that is different from the first protocol;
determining a second priority of the command based on the first priority and the request type; and
generating an internal command for a memory operation from the command and scheduling the internal command based on the second priority.

20. The method of claim 19, wherein the request type is one of an emergency request and a normal request, and wherein the emergency request is associated with a higher priority than the normal request.

* * * * *